(12) United States Patent
Murray et al.

(10) Patent No.: US 6,284,407 B1
(45) Date of Patent: Sep. 4, 2001

(54) RETRACTABLE INTEGRATED RADIO SUPPORT STAND AND BATTERY INCLUDING A SUPPORT MEMBER

(75) Inventors: Thomas Anthony Murray; Michael Robert Gardner, both of Plantation, FL (US); J. Douglas Boger, Flowery Branch, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/376,868

(22) Filed: Aug. 18, 1999

(51) Int. Cl.[7] ............................. H01M 2/02; H01M 2/10
(52) U.S. Cl. ........................... 429/186; 429/96; 429/100
(58) Field of Search ......................... 429/98–100, 96, 429/97, 163, 186, 187

(56) References Cited

U.S. PATENT DOCUMENTS 3,704,761 * 12/1972 Barrett, Jr. ........................ 180/68.5
4,007,470 * 2/1977 Land .................................. 354/293
5,107,401 * 4/1992 Youn .................................. 361/393
5,436,088 * 7/1995 Castaneda .......................... 429/96
5,547,036 * 8/1996 Gawaskar ......................... 180/68.5
5,583,744 * 12/1996 Oguchi .............................. 361/683
5,594,617 * 1/1997 Foster ................................ 361/679
5,659,236 * 8/1997 Hahn .................................... 320/2

* cited by examiner

Primary Examiner—Carol Chaney
Assistant Examiner—Mark Ruthkosky
(74) Attorney, Agent, or Firm—Philip H. Burrus, IV

(57) ABSTRACT

This invention provides a support stand for portable electronic devices that is incorporated into a battery. The support stand is optionally detachable. When the support stand is closed, the electronic device fits into the hand or a belt holster in its normal fashion. When the support stand is open, the support stand allows the portable electronic device to rest at an angle relative to a horizontal surface. When applied to a cellular phone or two-way radio, the invention offers improved access to the display screen and microphone/speaker assembly, as well as offering improved antenna performance.

15 Claims, 4 Drawing Sheets

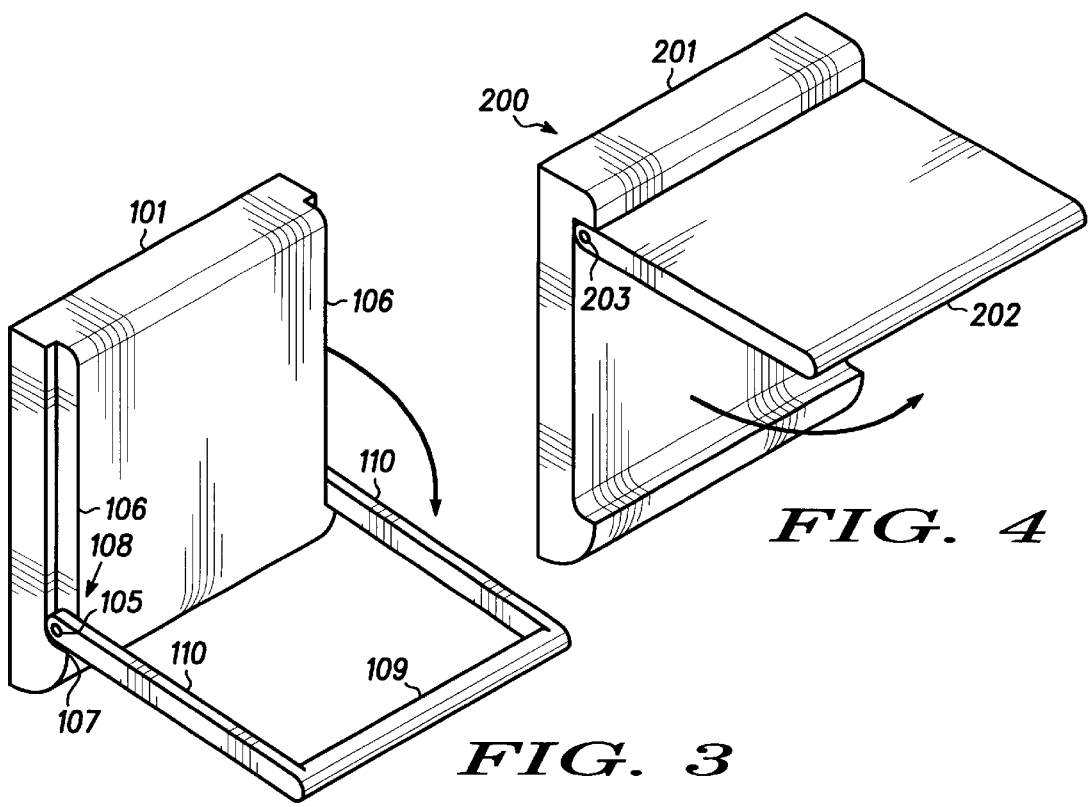
FIG. 3
FIG. 4
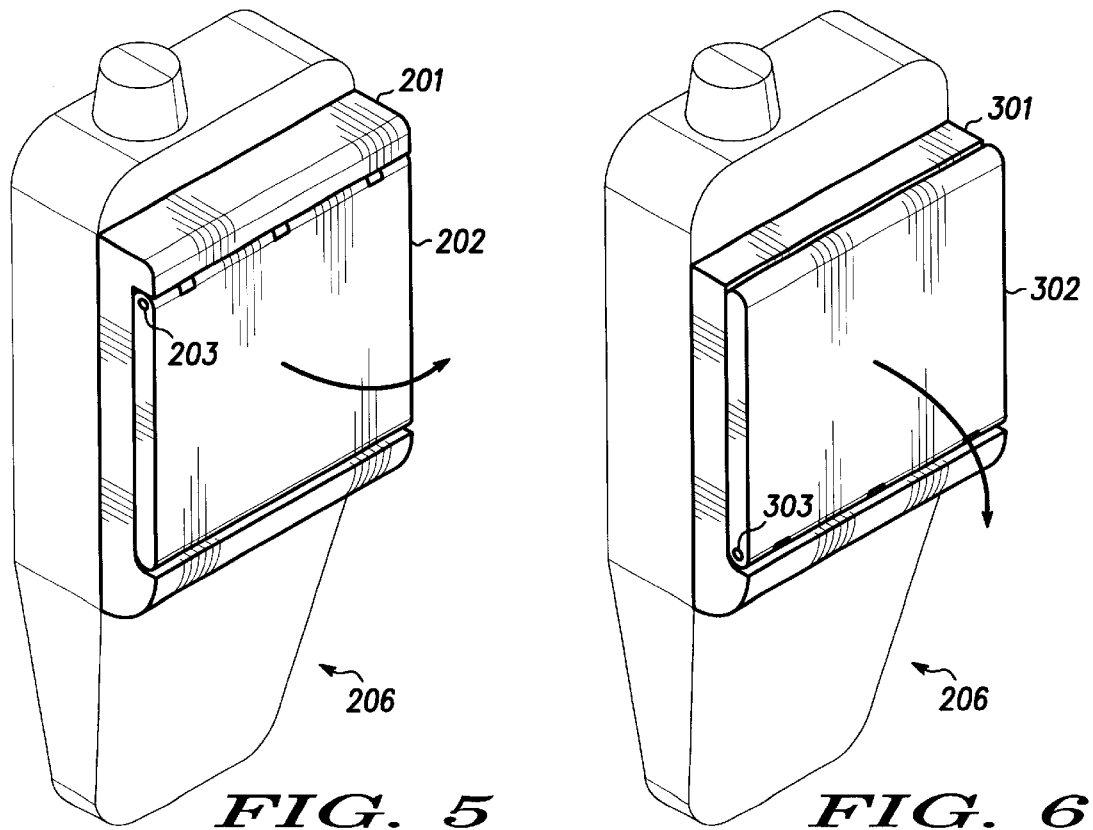
FIG. 5
FIG. 6

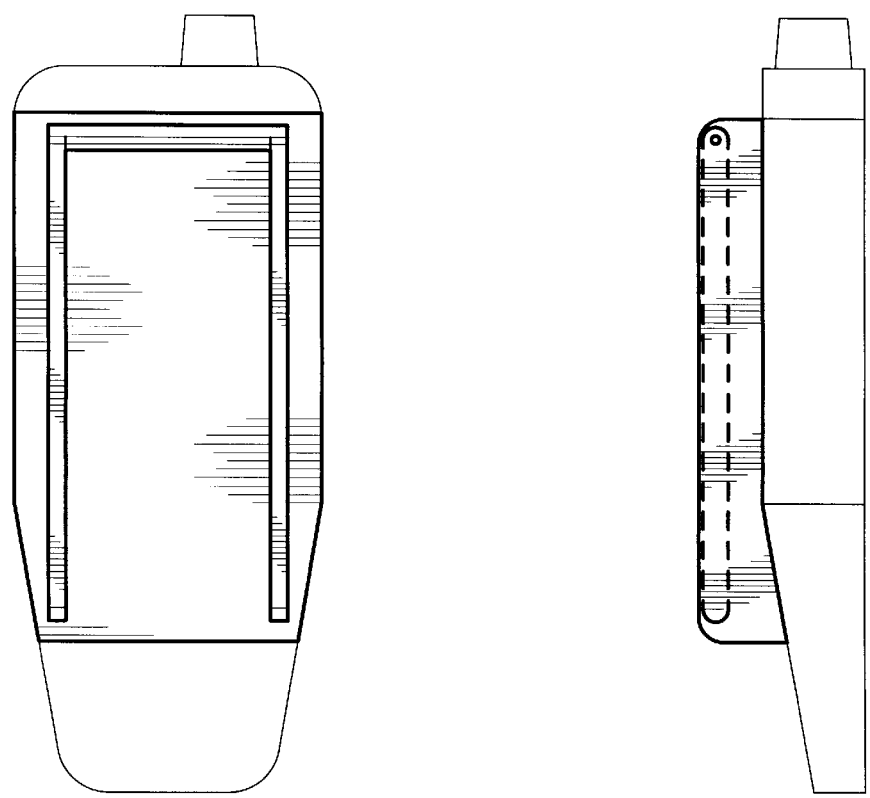
FIG. 7
FIG. 8
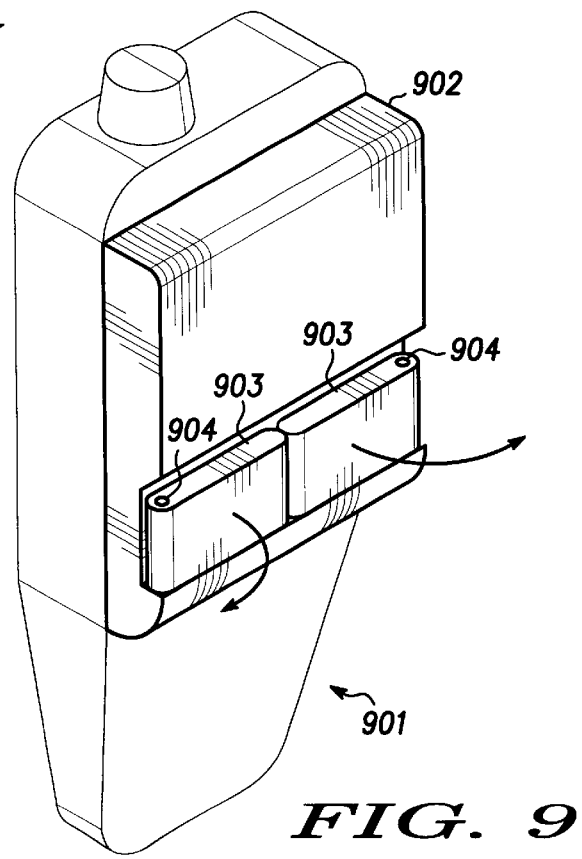
FIG. 9

RETRACTABLE INTEGRATED RADIO SUPPORT STAND AND BATTERY INCLUDING A SUPPORT MEMBER

TECHNICAL FIELD

This invention relates generally to rechargeable batteries and, more specifically to rechargeable batteries for portable electronic devices.

BACKGROUND

Cellular phones are becoming ever more popular. With the rapid advance of technology, along with the rapid reduction in cost, the cellular phone, once a novelty, is now becoming commonplace. It is trivial today to get service with 1000+ minutes per month, call waiting, three-way calling, caller ID, paging and voice mail for $30–$50 per month. As a result, more and more people are purchasing and using cellular phones on a regular basis.

The phones themselves, are becoming highly integrated, with more and more features becoming standard. For instance, Motorola recently introduced the StarTac® clipOn data organizer which turns a normal cellular phone into a management device that keeps track of telephone numbers, appointments and to-do lists. The Nextel i1000® phone has a built in speaker phone and pager. Today's cellular telephones are thus becoming multifunctional desktop tools in addition to telephony devices.

The general trend in telephone design, however, is making the phones smaller and more ergonomic. Telephone manufacturers including Nokia, Motorola, and Ericsson are all designing smaller phones with more contours and rounded surfaces. An example would be the Motorola V-Series, or the Nokia 6100 series telephones. These phones are small enough to fit in a pocket. They can also generally be worn on a belt in a custom holster. They are generally curved with no flat surfaces in order to fit comfortably within the hand.

The drawback to these smaller, more contoured designs is that they are incapable of standing upright upon a desk. They lay on the largest surface which generally results in the display, speaker, microphone, and keypad facing the ceiling. The user, in order to clearly see the phone, as well as to talk directly into the microphone, must position himself over and above the phone, which is awkward. This is very much a problem with phones that include features like speaker phone and voice recognition, for they do not perform optimally unless the user speaks directly into the microphone. Further, it is disconcerting when the phone has a limited viewing angle with which to see the display. While phone manufacturers often provide desk stand chargers, they can be cumbersome to carry as well as expensive.

There is therefore a need for a self contained means for standing a cellular phone or radio upon a desk.

SUMMARY OF THE INVENTION

This invention integrates a retractable support stand with a rechargeable battery pack. The invention allows a portable phone or radio to stand on a flat surface, thereby offering the user greater ability to hear, see and communicate with the phone or radio. The invention may be implemented as either a permanent feature of the battery design, or as a secondary accessory that can be detached from the battery. The invention offers numerous advantages, including enhancing audio quality by allowing the microphone and speaker to be aligned toward the user; providing a better view of the display; and enhancing antenna performance.

BRIEF DESCRIPTION OF THE DRAWINGS

FIG. 3 shows an isometric view of a battery in accordance with the invention.

FIG. 4 shows a first alternate embodiment of a battery in accordance with the invention.

FIG. 5 shows a phone with the first alternate embodiment of a battery in accordance with the invention.

FIG. 6 shows a phone with a second alternate embodiment of a battery in accordance with the invention.

FIG. 7 shows a phone with a third alternate embodiment of a battery in accordance with the invention.

FIG. 8 shows a side view of a phone with a fourth alternate embodiment of a battery in accordance with the present invention.

FIG. 9 shows a phone with a fifth alternate embodiment of a battery in accordance with the invention.

DETAILED DESCRIPTION OF THE INVENTION

Figure 1:
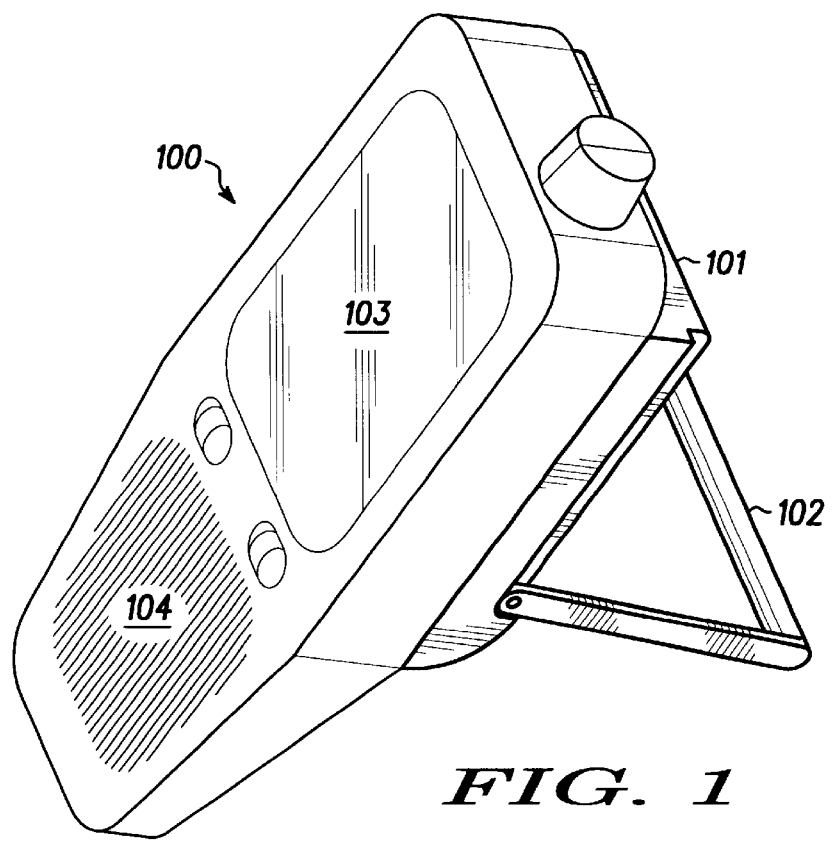
FIG. 1 shows an isometric view of a phone with a battery in accordance with the present invention.

Referring now to FIG. 1, a phone 100 with a preferred embodiment of a battery 101 in accordance with the present invention is shown in an isometric view. Also shown in FIG. 1 are the display screen 103 and the microphone/speaker assembly 104 of the phone. The essence of the invention is a support member 102 which hinges outward from the battery 101 when the phone 100 is placed upon a flat surface.

Figure 2:
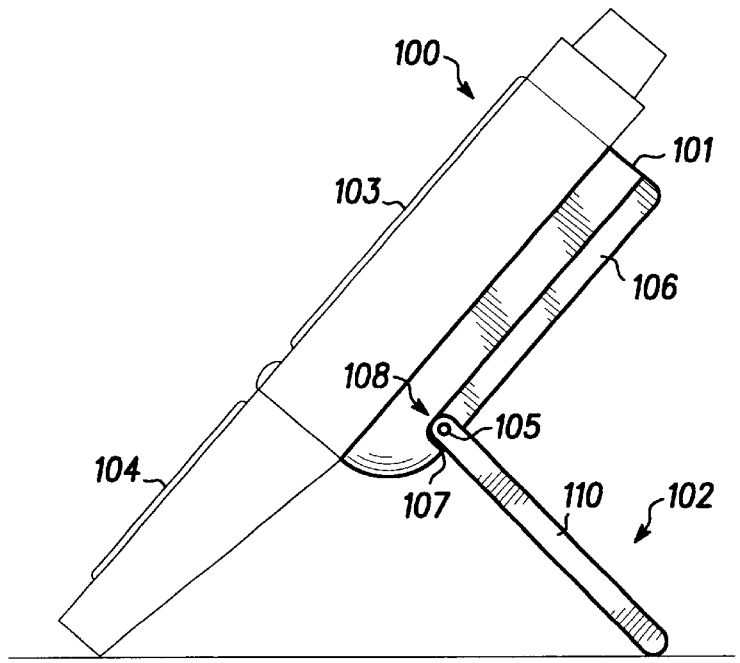
FIG. 2 shows a side view of a phone with a battery in accordance with the present invention.

The combination of the present invention and a phone can be seen more clearly in FIG. 2. In this side view, the phone 100 is shown with display screen 103 and microphone/speaker assembly 104. A battery 101 in accordance with the present invention is shown with the support member 102 extended. In this preferred embodiment, the support member 102 is a squared, "U" shaped part, where the ends 108 of the squared U attach to the battery. The ends 108 of the support member 102 are connected to the battery 101 by a pin 105 extending from the battery 100 housing. When the support member 102 is in its retracted (non-extended or closed) state, the sides 110 of the support member 102 fit into a recess 106 molded into the battery 100 housing, thereby forming an even contour across the surface of the battery 101.

The battery 100 housing is generally manufactured by injection molding plastic. The support member 102 could easily be made the same way. Alternately, the support member 102 could be constructed of metal, wood, epoxy, composite material or other like substance.

The invention works as follows: The battery 101 is first attached to the phone 100 by normal means. When the phone 100 is in a vertical position, the user simply rotates the support member 102 counterclockwise (relative to the perspective shown in FIG. 2) until the sides 110 of the support member 102 seat within the recess 106 of the battery 101. This closed position allows the phone 100 to be placed in a belt holster.

When the user begins to place the phone 100 on a horizontal surface, gravity causes the support member to rotate clockwise (relative to FIG. 2) between 1 and 180 degrees (relative to the battery) until the ends 108 of the support member 102 contact stops 107 contoured within the battery 101. This is the open position of the support member 102. The stopping point is generally at an optimum rotation of around 110 degrees. In this mode, the invention thereby provides support for the phone 100, allowing the phone 100 to rest at an angle relative to the horizontal surface. With the phone 100 positioned at an angle, generally between 0 and 90 degrees relative to the horizontal surface, the user is offered a better view of the display screen 103, as well as better communication with the microphone/speaker assembly 104.

Another advantage of the invention is improved antenna performance. As the antenna is now able to emit transmissions into free space, as opposed to into the table when the phone is laying, flat, communication with the reciprocating device (e.g. other phone, other radio, or land station) is improved.

Referring now to FIG. 3, a battery 101 in accordance with the invention without a phone is shown. In this figure the components described above, including support member 102 with base 109, sides 110 and ends 107 can more clearly be seen. The pins 105 which attach the support member 102 to the battery 101 can also be seen. The recess 106 for the sides 110 of the support member 102 are shown, along with the stops 107 that prevent the support member 102 from making more than a 180° C. rotation. In FIG. 3, the support member 102 is shown in its open state.

While in the aforementioned preferred embodiment the support is free wheeling, numerous modifications can be made without deviating from the spirit of the invention. For instance, if a free wheeling support member operated by gravity is not desired, small snaps may be added to the recesses and correspondingly to the sides of the support member. These snaps would keep the support member "locked" in the closed position. The user would then be responsible for rotating the support member manually as opposed to allowing gravity to cause the rotation. Snaps could be added in the extended state as well, to prohibit nuisance closing.

Also, in the preferred embodiment described above, the pins have been positioned towards the bottom of the battery. This was done because as the pins move more towards the bottom of the phone, the phone tends to rest at a more vertical angle relative to the horizontal plane. This more vertical angle generally offers the user a better view of the phone. However, the invention is also quite effective when the pins are placed at the top of the battery, which causes the support member to open in the opposite direction . Such an embodiment is shown in FIG. 8.

In this vain, a second embodiment of the invention is shown in FIG. 4. Here, the support member 202 takes the form of a door as opposed to the squared U shape shown in FIGS. 1, 2 and 3. Additionally, the pins 203 have been moved to the top of the battery 200, causing the support member 202 to extend by rotating counterclockwise. This embodiment of the invention is shown attached to a phone 206 in FIG. 5.

A third embodiment of the invention is shown in FIG. 6. Here, the pins 303 are located at the bottom of the battery 301. This embodiment operates generally in the same fashion as that described in FIGS. 1, 2, and 3. In this embodiment, however, the support member 302 takes the form of a door as opposed to a squared U.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the invention has been cast as a support member that is permanently integrated into the battery, it is contemplated that the support member could be a detachable feature which could be removed from the battery pack. In this manner, the user could attach or detach the support member at will.

Figure 10:
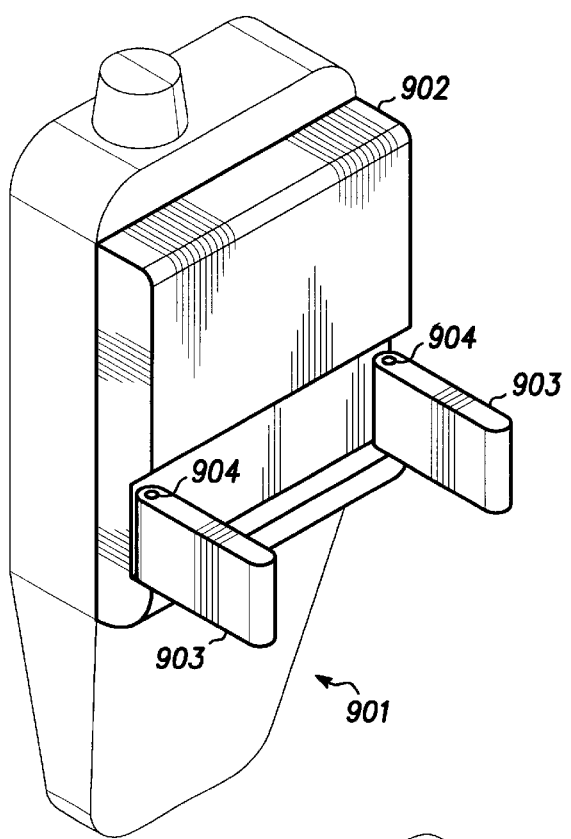
FIG. 10 shows a fifth embodiment of a battery in accordance with the invention.
Figure 11:
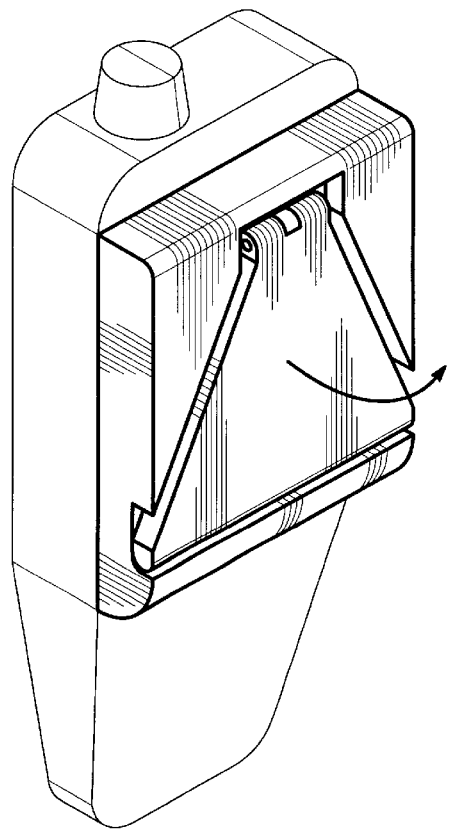
FIG. 11 shows a sixth embodiment of a battery in accordance with the invention.
Figure 12:
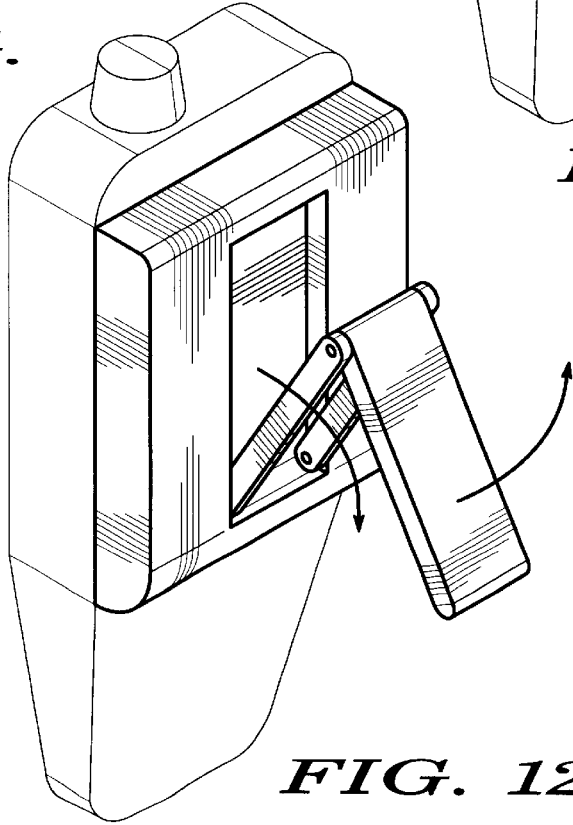
FIG. 12 shows a seventh embodiment of a battery in accordance with the invention.

Additionally, FIGS. 9 and 10 illustrate alternate embodiments in which the support members 903 open in a horizontal fashion, as opposed to the motion described in FIGS. 1 through 8. FIGS. 11 and 12 show additional embodiments of the invention.

What is claimed is:

1. A battery for electronic devices, the battery comprising a pivoting support member, wherein gravity actuates the pivoting support member.

2. A battery as in claim 1, wherein the pivoting support member is detachable.

3. A battery as in claim 1, wherein the electronic device is selected from a group of devices consisting of a cellular telephone and a two way radio.

4. A battery for a portable electronic device, the battery comprising:
 a) a support member for supporting a portable electronic device having the battery coupled thereto at an angle relative to a horizontal surface; and
 b) pivoting means coupled to the support member for attaching the support member to the battery,
wherein the support member is actuated by gravity and rotates about the pivoting means between a closed position of 0 degrees relative to the battery to an open position of between 1 and 180 degrees relative to the battery.

5. A battery as in claim 4, further comprising stopping means for limiting amount of rotation of the support member relative to the battery.

6. A battery as in claim 4, wherein the pivoting means are located at the base of the battery.

7. A battery as in claim 4, wherein the pivoting means are located at the top of the battery.

8. A battery as in claim 4, wherein the support member further comprises a squared U shape.

9. A battery as in claim 8, wherein the support member is detachable.

10. A battery as in claim 4, wherein the support member further comprises a door.

11. A battery as in claim 10, wherein the support member is detachable.

12. A battery for a portable electronic device, the battery comprising a support member for supporting a portable electronic device at an angle relative to a horizontal surface; and pivoting means for attaching the support member to the battery, wherein the support member rotates about the pivoting means between a closed position of 0 degrees relative to the battery to an open position of between 1 and 180 degrees relative to the battery, wherein the support member further comprises a squared U shape.

13. A battery as in claim 12, wherein the support member is detachable.

14. A battery for a portable electronic device, the battery comprising a support member for supporting a portable electronic device at an angle relative to a horizontal surface; and pivoting means for attaching the support member to the battery, wherein the support member rotates about the pivoting means between a closed position of 0 degrees relative to the battery to an open position of between 1 and 180 degrees relative to the battery, wherein the support member further comprises a door.

15. A battery as in claim 14, wherein the support member is detachable.

\* \* \* \* \*